(No Model.)
T. A. MILLER.
BEAN OR GRAIN THRASHING MACHINE.
No. 504,359. Patented Sept. 5, 1893.
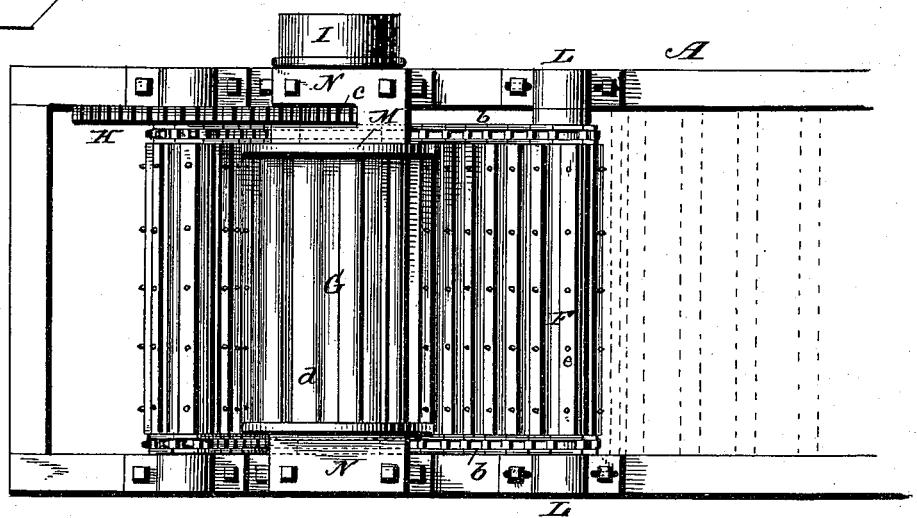
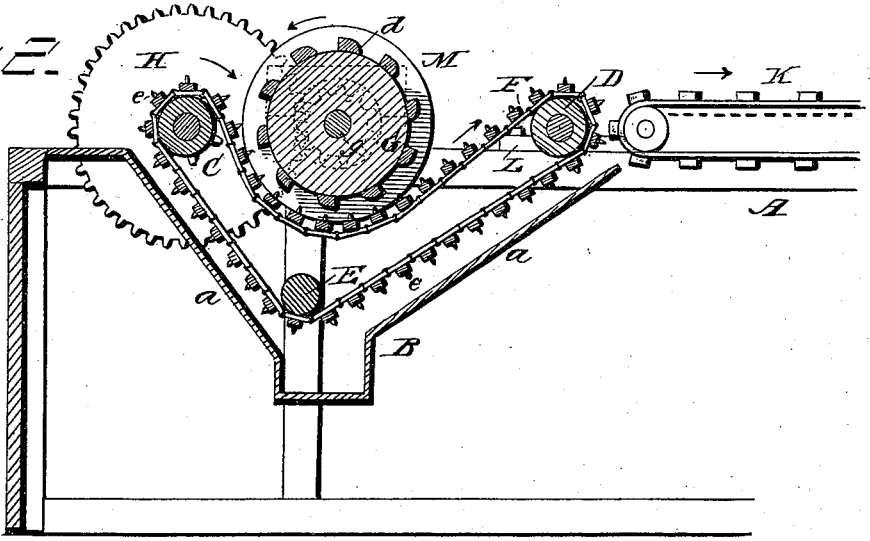
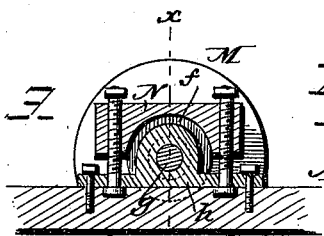
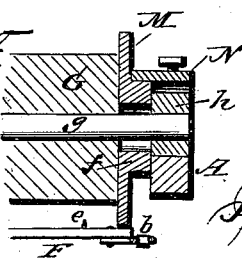
Witnesses
C. J. Williamson
Chas. H. Fowler
Inventor
Thomas A. Miller,
per Chas. H. Fowler
Attorney.

UNITED STATES PATENT OFFICE.

THOMAS A. MILLER, OF STOCKTON, CALIFORNIA.

BEAN OR GRAIN THRASHING MACHINE.

SPECIFICATION forming part of Letters Patent No. 504,359, dated September 5, 1893.

Application filed April 10, 1893. Serial No. 469,738. (No model.)

*To all whom it may concern:*

Be it known that I, THOMAS A. MILLER, a citizen of the United States, residing at Stockton, in the county of San Joaquin and State of California, have invented certain new and useful Improvements in Bean or Grain Thrashing Machines; and I do hereby declare that the following is a full, clear, and exact description of the same, reference being had to the annexed drawings, making a part of this specification, and to the letters of reference marked thereon.

The present invention has for its object to provide a machine that will successfully and thoroughly thrash beans or peas and remove them from their pods without injury to the kernels, and consists in a machine constructed substantially as shown in the drawings and hereinafter described and claimed.

Figure 1 of the drawings represents a top plan view of the machine; Fig. 2 a longitudinal section thereof; Fig. 3 a sectional elevation in detail and on an enlarged scale showing the bearing of the rubbing cylinder shaft or journal, and one of the disks at the end thereof and means for adjusting it; Fig. 4 a longitudinal section thereof taken on line $x \, x$.

In the accompanying drawings A represents a suitable frame of any desirable form and construction and is provided with a receptacle B for the thrashed beans as they are discharged from the machine, the receptacle having inclined sides $a$ to form a chute upon each side thereof. Rollers C D E have their bearing in the frame A and over these rollers passes an endless slatted apron F of any preferred construction which has connected thereto sprocket chains $b$ engaging with sprocket teeth upon the rollers C D.

A rubbing or thrashing cylinder G is located above the endless apron F and has a pinion $c$ to engage with a large gear wheel H upon the journal of the roller C, and upon the journal of the cylinder G is a belt-pulley I over which passes a belt from a suitable driving power and by which means motion is imparted to the machine.

The thrashing cylinder G is provided upon its periphery with rubbers $d$ extending longitudinally thereof, and when the cylinder and apron are in motion, the beans as they pass between them will be thrashed out or shelled by the rubbing action of the slats upon the apron and the rubbers upon the cylinder, and as the beans are removed from their pods they will be carried forward by the moving apron and will drop on one of the inclined sides of the receptacle A and be deposited therein. The pods and vines are carried over upon an endless belt K arranged over a suitable screen, and by the belt delivered to a suitable place of deposit. The slats of the apron F have teeth $e$ so as to hold the pods with their kernels until properly acted upon by the thrashing cylinder to separate them.

To prevent too great a pressure of the thrashing cylinder upon the beans which would tend to injure the kernel, the endless slatted apron is rendered adjustable by means of the adjustable bearings L, and in order to have the required pressure upon the apron, the ends of the cylinder have adjacent thereto adjustable disks M which are free to revolve independently thereof. These disks have a central hub $f$ with an opening considerably larger in diameter than the diameter of the journal $g$ so that the disks may be adjusted vertically and sufficiently to have their edges come in contact with the slatted apron. The journal of the cylinder G has its bearings in suitable boxes $h$ secured upon the top of the frame A, and over the boxes are adjustable followers N, which are held in their adjusted position by means of bolts and nuts or other well known and preferred means. This adjustment to increase or diminish the space between the endless slatted apron and the thrashing cylinder, enables the machine to be used for thrashing wheat or other grain as well as beans or peas.

Having now fully described my invention, what I claim as new, and desire to secure by Letters Patent, is—

A bean or grain thrasher, consisting of a suitable frame, rollers and an endless slatted apron and means for adjusting it, a thrashing cylinder, adjustable disks located at the ends of the cylinder, and followers for holding the disks in their adjusted position, substantially as and for the purpose described.

In testimony that I claim the above I have hereunto subscribed my name in the presence of two witnesses.

THOMAS A. MILLER.

Witnesses:
ALLICE CRAIG,
W. E. MILLER.